March 3, 1959 | J. W. WENTWORTH | 2,876,347

COLOR TELEVISION

Filed Dec. 4, 1953 | 7 Sheets-Sheet 1

INVENTOR.
JOHN W. WENTWORTH

BY [signature]

ATTORNEY

INVENTOR.
JOHN W. WENTWORTH
BY [signature]
ATTORNEY

March 3, 1959 J. W. WENTWORTH 2,876,347

COLOR TELEVISION

Filed Dec. 4, 1953 7 Sheets-Sheet 3

INVENTOR.
JOHN W. WENTWORTH
BY Olin J. Mitchell
ATTORNEY

March 3, 1959 J. W. WENTWORTH 2,876,347

COLOR TELEVISION

Filed Dec. 4, 1953 7 Sheets-Sheet 4

INVENTOR.
JOHN W. WENTWORTH

BY

ATTORNEY

March 3, 1959 J. W. WENTWORTH 2,876,347

COLOR TELEVISION

Filed Dec. 4, 1953 7 Sheets-Sheet 5

INVENTOR.
JOHN W. WENTWORTH

BY [signature]

ATTORNEY

INVENTOR.
JOHN W. WENTWORTH
BY [signature]
ATTORNEY

INVENTOR.
JOHN W. WENTWORTH

BY [signature]

ATTORNEY

United States Patent Office 2,876,347

Patented Mar. 3, 1959

2,876,347

COLOR TELEVISION

John W. Wentworth, Haddonfield, N. J., assignor to Radio Corporation of America, a corporation of Delaware Application December 4, 1953, Serial No. 396,170

9 Claims. (Cl. 250—27)

This invention relates to test apparatus for color television receivers and, particularly, to apparatus for use in testing the phase alignment of the subcarrier demodulator circuits and the gain adjustment of the matrixing circuits employed in receivers and monitors for converting the received color signals to a form suitable for image-reproducing purposes.

In accordance with the presently proposed standards of the National Television System Committee (NTSC), the signal which is transmitted consists of a luminance signal and one or more so-called color difference signals. The luminance signal is made up of predetermined proportions of the signals representing a plurality, such as three selected component colors of a subject. The color difference signals are of a character such that, when each is combined with the luminance signal, there is produced a signal representative of one of the selected component subject colors and which may be employed in this form for image-reproducing purposes.

The color difference signals are transmitted on a subcarrier wave having a frequency which is at the relatively high end of the frequency band including the luminance signal. The subcarrier wave has a frequency which is a large odd multiple of one half of the horizontal or line scanning frequency. By this means, the energy concentrations in the side bands of the color subcarrier wave are interleaved with the discrete energy concentrations of the luminance signal. In view of the fact that all three of the colors are represented in the luminance signal, it is necessary to transmit only two color difference signals. In this case, at a receiver, the third color difference signal may be derived in a suitable manner by proper combination of the two transmitted color difference signals and the luminance signal.

In transmitting the color difference signals, it is the practice to modulate them respectively on two quadrature phases of the subcarrier wave. Within the frequency range in which both side bands of the color subcarrier wave are transmitted, there is no distortion of the color difference signals. However, since the color subcarrier wave has a frequency which is in the upper region of the pass band of the communication channel, some of the higher color difference modulating signals are transmitted in only one of the color subcarrier wave side bands. In this single side band region, therefore, it is the practice to transmit only a single color difference signal in order to avoid signal distortion.

Generally considered, any two color difference signals may be transmitted by modulating quadrature phases of the subcarrier wave. It is desirable, however, that the subcarrier wave modulating signals be chosen in such a way as to provide the most acceptable image reproduction when only a single color difference signal is transmitted in the single side band region. It has been found that the color difference signals themselves do not provide the best kind of image reproduction. It, therefore, has been the practice recently to derive two signals (designated "I" and "Q") by which to modulate the quadrature phases of the subcarrier wave, which signals are combinations of two of the color difference signals. Accordingly, at a receiver the color difference signals for proper combination with the luminance signal must be derived from the subcarrier wave modulating signals. For this purpose, a converter is required. Such a converter has been called, because of its character, a matrixing circuit. In the present usage, it will be understood that a matrixing circuit is electronic apparatus for additively and/or subtractively combining signal voltages to change them from one form to another.

By reason of the fact that the "I" and "Q" signals are not present in an identifiable form in a picture signal, since such a signal is a continuously varying vector sum of the "I" and "Q" components, it is impracticable to attempt to test the phase alignment of a receiver through the use of a transmitted broadcast signal. Hence, it is a primary object of the present invention to provide means for synthetically producing subcarrier frequency signals of the "I" and "Q" phase whereby the phasing of the corresponding demodulators in a color television receiver may be checked in a simple, yet quite accurate manner.

Moreover, since the converter or matrix circuits referred to above must derive the color difference signals accurately from the demodulated "I" and "Q" signals in order for proper color reproduction to be realized, it is necessary to afford a check on the matrix itself. Thus, it is another object of this invention to provide means for producing accurate indications of the manner of operation of the color difference signal deriving circuits of a receiver matrix arrangement.

In general, the test signal generator of the present invention comprises means for producing, within a standard television line interval, a plurality of "bursts" of color subcarrier wave frequency, each burst having a predetermined phase with respect to a reference phase such that the bursts serve as a synthetic signal by which the state of the receiver circuits' phase alignment may be readily and visually determined. The first such burst in a television line interval (which may, for example, be 1/15750 sec. in duration) is so chosen as the phase with respect to the other bursts that, at selected points in the receiver, certain of the bursts produce a predetermined level of instantaneous voltage in the case of a properly aligned receiver. More specifically, as will appear hereinafter, the several bursts may be so related in phase at the output of the signal generator that the proper indication at the several points checked is zero, thereby facilitating a rapid determination of phase alignment of the receiver circuits. Since, as is understood, proper operation of the receiver color reference oscillator requires synchronization thereof at frequent intervals normally corresponding to television line rate, the signal generator includes means for producing a signal for synchronizing the receiver oscillator.

While the test generator of the present invention is capable of affording all of the test signals described in general terms above, it is relatively simple and inexpensive when compared to the valuable assistance which it renders in the alignment and servicing of color television monitors and receivers.

Additional objects and advantages of the present invention will further suggest themselves to persons skilled in the art from a study of the following detailed description of the accompanying drawing, in which.

In order that the utility of the instant invention may be fully understood and appreciated, there follows a somewhat detailed description of a typical color television receiver capable of reproducing a color television image from the signal of the proposed NTSC type.

Figure 1:
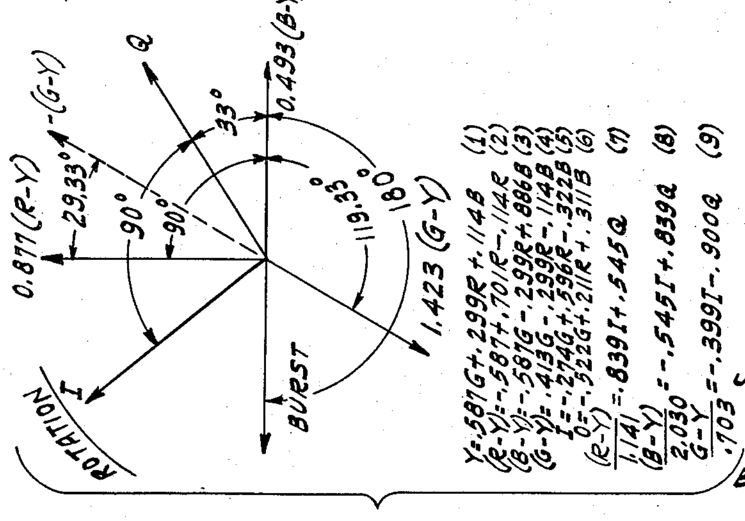
Fig. 1 is a vector diagram together with certain equations representing the relationship of the color difference signals and the color subcarrier wave modulating signals in a system with which the present invention may be advantageously employed.

Reference first will be made to Fig. 1 of the drawings for a general description of the color television signalling system in which the present invention is embodied. This figure includes a vector diagram in which the respective red, blue and green color difference signals are represented by the vectors $(R-Y)$, $(B-Y)$ and $(G-Y)$. It will be understood that this vector diagram represents only the angular relationship between the various signals referred to. The illustrated lengths of the vectors is insignificant, since these lengths change with the different color content of the subject represented by the signals. Also, it will be understood that, with respect to the color difference signals $(R-Y)$, $(B-Y)$ and $(G-Y)$, the representative vectors indicate the angular relationship between such signals, if, in fact, the color subcarrier wave were modulated directly by the color difference signals. In this system, however, the color subcarrier wave is not directly modulated by these color difference signals, so that the various representative color difference signals are shown merely for reference purposes. In this connection, it is noted that the burst signal vector is 180° out of phase with the blue color difference signal $(B-Y)$. The burst signal is employed in a manner to be described more fully subsequently to effect synchronous operation of the color signalling apparatus at the transmitter and receiver.

It also may be noted from the vector diagram of Fig. 1 that the red color difference signal $(R-Y)$ leads in phase the blue color difference signal $(B-Y)$ by 90°. Accordingly, the burst signal leads the red color difference signal $(R-Y)$ by 90°. Furthermore, in accordance with the presently proposed NTSC standards, the system operates by the modulation of the color subcarrier wave directly by two signals designated respectively as the "I" and "Q" signals. From the vector diagram, it may be seen that the "I" signal leads the "Q" signal in phase by 90°. Also, the "I" and "Q" signals lead in phase, respectively, the red color difference signal $(R-Y)$ and the blue color difference signal $(B-Y)$ by 33°.

In the remaining portion of Fig. 1, the different amplitude relationships between the various vectors representing signals shown in this figure are given by the equations in which the quantities referred to are signal voltages. In order to present the relationships between the various signal voltages as clearly as possible, it will be understood that the various letters and quantities represented by letters grouped together in brackets or parenthesis represent the signal voltages indicated by the different letters referring to the different color and the luminance signals. As indicated in Equation 1, the luminance signal "Y" is made up of the algebraic sum of the specified quantities of the green, red and blue signals G, R and B respectively representing light of these colors derived from the subject. Also, in Equations 2, 3 and 4 the various color difference signals $(R-Y,)$ $(B-Y)$ and $(G-Y)$ are given in terms of the color signals representing the subject. The "I" and "Q" subcarrier wave modulating signals are given in Equations 5 and 6, respectively, in terms of the different color signals representing the subject. In addition, the color difference signals $(R-Y)$, $(B-Y)$ and $(G-Y)$ are expressed in Equations 7, 8 and 9 in terms of the "I" and "Q" subcarrier wave modulating signals. These latter relationships, particularly with reference to the signs of the "I" and "Q" signals, may be seen to correspond with the relationships shown in the vector diagram of this figure. The denominators of the left-hand terms of these equations are indicative of the amplification which the algebraic sums of the related "I" and "Q" modulating signals should be given in order to produce the proper color difference signals for combination with the luminance signal to develop the proper color signal for image-reproducing purposes.

Figure 2:
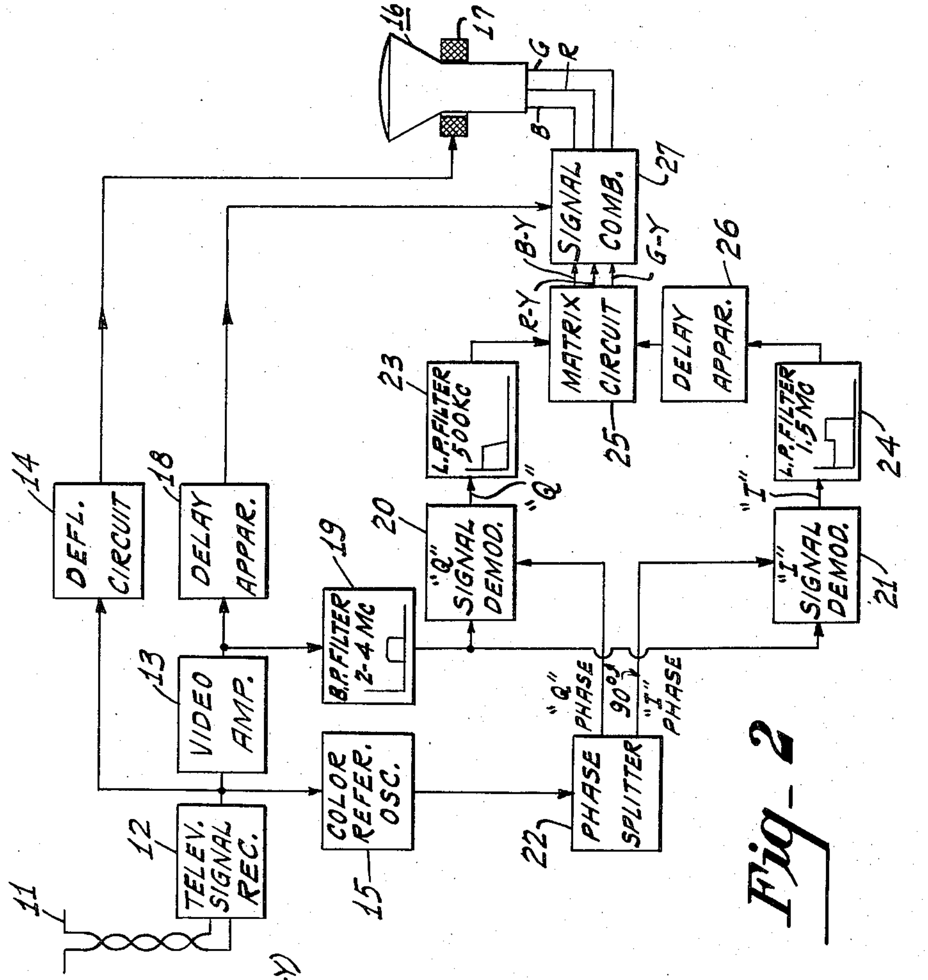
Fig. 2 is a block diagram of a proposed, typical type of color television receiver to which the test signal of this invention may be applied in checking phase alignment.

Reference now will be made to Fig. 2 for a general description of a representative type of color television signal-receiving and image-reproducing apparatus in which the present invention is embodied. A carrier wave on which the composite color television signal is modulated is intercepted by an antenna 11 which is coupled in a conventional manner to a television receiver 12. It will be understood that this receiver includes such conventional apparatus as carrier wave amplifiers, at both radio and intermediate frequencies, a frequency converter and a second or signal detector. Accordingly, it will be understood that there is derived from the signal detector in the output circuit of the receiver 12 a composite intelligence signal having both video and synchronizing signal components. The video signal component is a composite luminance and chrominance signal in accordance with the present NTSC proposed standards, while the synchronizing signal component includes the conventional horizontal and vertical synchronizing signals by which the deflection apparatus is controlled and, in addition, a color synchronizing signal.

The composite video signal component is impressed upon a video signal amplifier 13. The deflection synchronizing signal is impressed upon the deflection circuit apparatus 14. The color synchronizing signal is impressed upon apparatus by which to control the frequency and phase of a reference frequency oscillator 15.

The video amplifier 13 may be conventional apparatus including one or more stages of video signal amplification and having a comparatively wide pass band of the order of 5 megacycles. The deflection circuits 14 also may be conventional and include the usual sync signal separators, automatic frequency control apparatus and sweep frequency generators to produce substantially sawtooth waves respectively at horizontal and vertical deflection frequencies. The reference frequency oscillator is one which is capable of oscillating with relatively good stability to produce a reference frequency of the order of 3.58 megacycles. More specifically, in accordance with the presently proposed NTSC standards, the frequency of this oscillator is 3.579545 megacycles which is the 455th harmonic of one-half of the line or horizontal deflection frequency when the latter is defined as the 572nd subharmonic of 4.5 mc. (the standard spacing between picture and sound carriers in a television broadcast channel).

This composite intelligence signal, when directed into the various circuits described, is effective to control the operation of an image-reproducing device such as a tricolor kinescope 16. Such a kinescope is or may be of the same general type as that described in a paper by H. B. Law entitled "A Three-Gun Shadow-Mask Color Kinescope" and published in the Proceedings of the I. R. E., vol 39, No. 10, October, 1951 at page 1186. Such a color kinescope also forms the subject matter of U. S. Patent No. 2,595,548 granted May 6, 1952 to A. C. Schroeder and entitled "Picture Reproducing Apparatus."

The video signals, after the necessary processing in a manner to be described, are impressed upon the beam intensity control apparatus of the kinescope 16. The horizontal and vertical deflection waves are impressed upon a yoke 17 for the purpose of scanning the usual raster upon the luminescent screen of the kinescope.

The composite video signal derived from the amplifier 13 is impressed upon a luminance signal channel including time delay apparatus 18 and indicated as conveying the "Y" signal. The purpose of the delay apparatus is to compensate for the inherent delay in some of the chrominance channel apparatus. The composite video signal is also impressed upon a chrominance signal channel through a band pass filter 19 which passes video signals in the range extending approximately from 2 to 4 megacycles. The output of the band pass filter 19 is impressed respectively upon "Q" and "I" signal demodulators 20 and 21. These demodulators are of a synchronous type in which the color subcarrier wave, together with its sidebands, are mixed with different phases of the reference frequency derived from the oscillator 15. Inasmuch as the "Q" and "I" signals are modulated upon the subcarrier wave in a quadrature phase relationship, the "Q" and "I" signal demodulators 20 and 21 have impressed thereon quadrature phases of the reference frequency wave. These quadrature phases are derived from a conventional phase splitter 22 coupled to the output of the reference frequency oscillator 15.

As a result of the synchronous demodulation by the "Q" and "I" signal demodulators 20 and 21 respectively, there are produced in the output circuits thereof the "Q" and "I" signals as indicated. The "Q" signal derived from the demodulator 20 is passed through a low pass filter 23 having a pass band of approximately 500 kilocycles. In a somewhat similar manner, the "I" signal derived from the output "I" signal demodulator 21 is passed through a low pass filter 24 having a pass band of approximately 1.5 megacycles.

The "Q" and "I" signals produced in the output circuits of the low pass filters 23 and 24, respectively, are impressed upon a matrixing circuit 25 by means of which they are converted into the green, blue and red color difference signals $(G-Y)$, $(B-Y)$ and $(R-Y)$, respectively. In the circuit coupling the low pass filter 24 to the matrixing circuit 25, there is included a delay apparatus 26 having for its purpose the introduction of a suitable delay in the "I" signals to compensate for the delay produced in the "Q" signals by the inherent operation of the low pass filter 23.

The green, blue and red color difference signals $(G-Y)$, $(B-Y)$ and $(R-Y)$, respectively, derived from the matrixing circuit 25 are impressed upon a signal combiner 27. Also, the "Y" or luminance signal derived from the delay apparatus 18 is impressed upon the signal combiner. This apparatus functions to combine the luminance or "Y" signal with the green, blue and red color difference signals $(G-Y)$, $(B-Y)$ and $(R-Y)$ in such a manner as to produce in its output circuit the green, blue and red signals G, B and R respectively representing the component colors of the image to be reproduced. These signals are impressed upon the electron beam intensity control electrodes of the tri-color kinescope 16 in a conventional manner.

The synchronizing of the reference frequency oscillator 15 with a similar color subcarrier wave oscillator at the transmitter may be effected by transmitting a burst of a few cycles of the subcarrier wave frequency on the back porch of each horizontal synchronizing signal. The burst of subcarrier wave frequency has the phase relationship, relative to the quadrature phase components of the subcarrier wave upon which the "I" and "Q" signals are modulated, indicated in the vector diagram of Fig. 1. The burst method of effecting color synchronization is substantially as described in detail in a publication entitled "Recent Developments in Color Synchronization in the RCA Color Television System" published by the Radio Corporation of America, February 1950. The receiver apparatus of such a system is disclosed particularly in Fig. 9 of that paper. Such a synchronizing system also forms the subject matter of a copending U. S. patent application of A. V. Bedford, Serial No. 143,800, filed February 11, 1950, now Patent No. 2,728,812, issued December 27, 1955, and titled "Synchronizing Apparatus."

Figure 3:
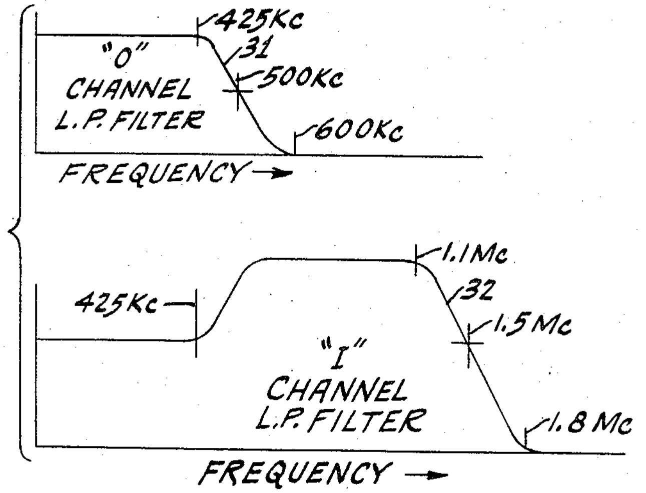
Fig. 3 illustrates curves indicating the frequency response of a receiver such as that of Fig. 2.

The characteristics of the low pass filters in the "I" and "Q" channels are indicated more particularly in the curves of Fig. 3, to which reference now will be made. The curve 31 represents the frequency response characteristic of the low pass filter 23 in the "Q" signal channel. Here it is to be noted that the response is substantially flat out to a frequency which is slightly less than 500 kilocycles and is substantially zero at a frequency of approximately 600 kilocycles.

In a like manner, the curve 32 represents the frequency response characteristic of the low pass filter 24 in the "I" signal channel. The overall frequency response in this channel is seen to be somewhat greater and is approximately 1.5 megacycles. Up to a frequency of approximately 425 kilocycles the response is substantially constant at a level which is approximately one-half of the level of the response in a higher frequency range up to approximately 1.1 megacycles. The response in the "Q" signal channel low pass filter 23 as represented by the curve 31 also is at about the same level as that of the response by the low pass filter 24 in the "I" signal channel as represented by the curve 32 up to a frequency of approximately 425 kilocycles. The reason for this amplitude relationship is that in the frequency range up to approximately 500 kilocycles, when both "I" and "Q" signals are present, the total energy represented by these two signals should be approximately the same as the energy of the "I" signal in the higher frequency range up to approximately 1.5 megacycles within which the "Q" is not present.

Figure 4:
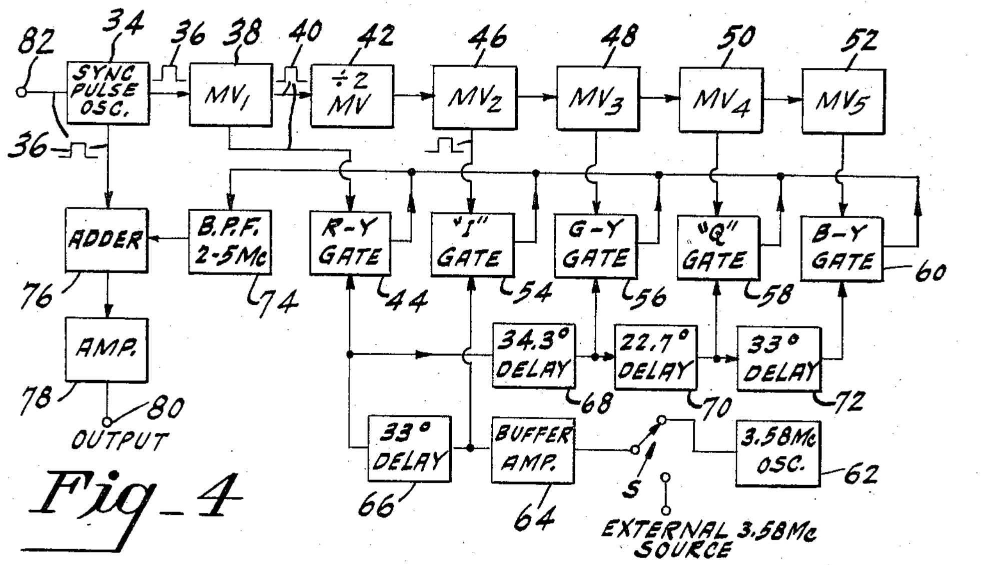
Fig. 4 is a block diagram of apparatus in accordance with the present invention.

Referring now to Fig. 4, there is shown a block diagram of a color test signal generator in accordance with the present invention. Since, as has been stated, it is necessary to provide horizontal synchronizing pulses to the receiver under test in order that its color "burst" gating and synchronizing circuits may perform properly, the apparatus of Fig. 4 includes a sync pulse oscillator 34 which may, as will be seen, comprise a free running or "astable" multivibrator producing substantially rectangular pulses 36 having a repetition rate of nominally 15.75 kc. for application to a multivibrator 38 whose output pulses 40 are applied, in turn, to a scale-of-two divider 42 and $(R-Y)$ gating circuit 44. The output of the divider multivibrator 42 is, in turn, employed to trigger multivibrator $MV_2$ indicated by block 46 at a rate of 7.875 kc. (or half of the normal television line repetition rate). Multivibrator 46, in turn, triggers multivibrator $MV_3$ (block 48) whose output triggers the succeeding multivibrator $MV_4$ indicated by block 50. The output pulse of the last-mentioned multivibrator triggers the final multivibrator $MV_5$ shown diagrammatically by block 52. Each of multivibrators $MV_2$, $MV_3$, $MV_4$ and $MV_5$ provides a gating pulse to its associated gate circuit, namely, the "I" gate 54, the $(G-Y)$ gate 56, the "Q" gate 58 and the $(B-Y)$ gate 60. A color subcarrier frequency wave is produced by a highly stable crystal oscillator 62 whose output, after amplification by buffer amplifier 64, is applied to the gate circuits after various amounts of electrical delay. More specifically, the subcarrier frequency wave of, for example, 3.58 megacycles is applied directly to the "I" gate tube 54. The subcarrier wave is delayed 33° as by means of an accurately cut cable 66 and applied to the $(R-Y)$ gate 44. The wave is further delayed 34.3° by cable section 68 and applied to the $(G-Y)$ gate. A further delay of 22.7° is introduced by cable portion 70 and the output thereof is applied to the "Q" gate. A final delay of 33° is introduced by delay means 72 and the resultant wave is applied to the $(B-Y)$ gate.

From the foregoing, it will be seen that the $(R-Y)$ gate tube 44 is keyed or pulsed "on" once during each television line interval, immediately following the synchronizing pulse 36. On the other hand, the "I," $(G-Y)$, "Q" and $(B-Y)$ gates are pulsed on by their associated multivibrators 46, 48, 50 and 52, respectively, only during alternate television line intervals. The output of each of the gate circuits is applied to a common band pass filter 74 whose function is that of removing undesired gating disturbances, the output of filter 74 being then applied to an adder circuit 76 which combines the outputs of the gate circuits with the sync pulses derived from oscillator 34. The output of adder 76 is then amplified by suitable means indicated by block 78 so that the composite test signal waveform produced by the apparatus is available at output terminal 80. An additional output terminal 82 coupled to the sync pulse oscillator 34 has available the sync pulses 36 for purposes to be described hereinafter.

Figure 5:
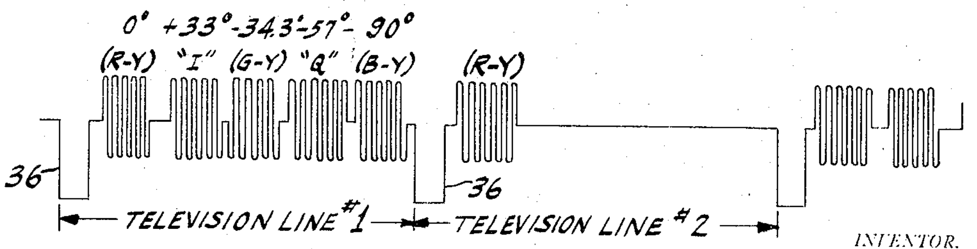
Fig. 5 illustrates a signal which the present invention is capable of producing.

In the operation of the apparatus of Fig. 4, the output wave form available at terminal 80 has the waveshape indicated in Fig. 5. As will be understood from the foregoing description of the block diagram of Fig. 4, its output waveform is as follows: At the beginning of each television line interval, there occurs a horizontal synchronizing pulse 36 followed by the burst produced by the $(R-Y)$ gate of Fig. 4. By reason of the fact that multivibrators 48, 50 and 52 are triggered at only half the frequency as multivibrator 38, their associated gating tubes are activated only during alternate television intervals. Thus, for purposes of illustration, television line 1 in Fig. 5 is shown as also including the "I" burst, the $(G-Y)$ burst, the "Q" burst and the $(B-Y)$ burst. Assuming, merely for purposes of having a convenient reference, that the $(R-Y)$ burst is considered as occurring at 0°, as indicated in Fig. 5, each of the additional bursts which occur during that television line interval will have a specific phase with respect to the $(R-Y)$ burst as determined by the amount of delay introduced by the various portions of the delay line of Fig. 4. Hence, the "I" burst in Fig. 5 will lead the $(R-Y)$ burst by 33°. Similarly, the $(G-Y)$ burst will lag the $(R-Y)$ burst by 34.3°. The "Q" burst will lag behind the $(R-Y)$ burst by 57° and the $(B-Y)$ burst will lag the $(R-Y)$ burst by 90°. During television line (2) of Fig. 5, the only subcarrier frequency burst which is present is the $(R-Y)$ burst. The next television line interval, only a portion of which is shown in Fig. 5, will include all five bursts, as explained supra.

It should be noted at this point that in accordance with the conventional operation of a color television receiver of the type described in connection with Fig. 2, the color reference oscillator in the receiver is maintained in proper synchronism with the subcarrier wave generator at the transmitter by means of a burst of reference phase which is transmitted immediately following each horizontal synchronizing pulse. While not shown in Fig. 2, such receivers normally have means including a source of horizontal frequency pulses for gating the color synchronizing bursts, out of the composite received signal which bursts, after separation, are then applied to a frequency control unit for the local color reference oscillator whereby to maintain the oscillator in proper phase with the transmitter. Thus, depending upon the phase of the color synchronizing burst which follows the synchronizing pulse, the local color reference oscillator will produce a subcarrier frequency wave having a particular phase with respect to the received synchronizing bursts. Since the phase angles of the last four bursts shown during television line (1) of Fig. 5 are meaningful only insofar as they refer to the phase of the first or $(R-Y)$ burst, this fact should be borne in mind during the later portions of this specification wherein the use of the apparatus disclosed herein will be described.

Before leaving Fig. 4, however, it may be noted that a switch "S" at the input of buffer amplifier 64 may be used to switch from the crystal oscillator 62 to some suitable external source of 3.58 megacycle wave in such cases as might make it desirable to employ an external subcarrier source.

A complete and operative embodiment of the present invention, which is shown diagrammatically by the block diagram of Fig. 4, is disclosed by Figs. 6–10. More specifically, as will be appreciated from an inspection of the drawing, Fig. 6 includes the sync pulse oscillator 34 and multivibrator 38 as well as multivibrator 42. In a similar manner, Figs. 7 through 10 disclose additional portions of the complete test signal generator of Fig. 4.

Figure 6:
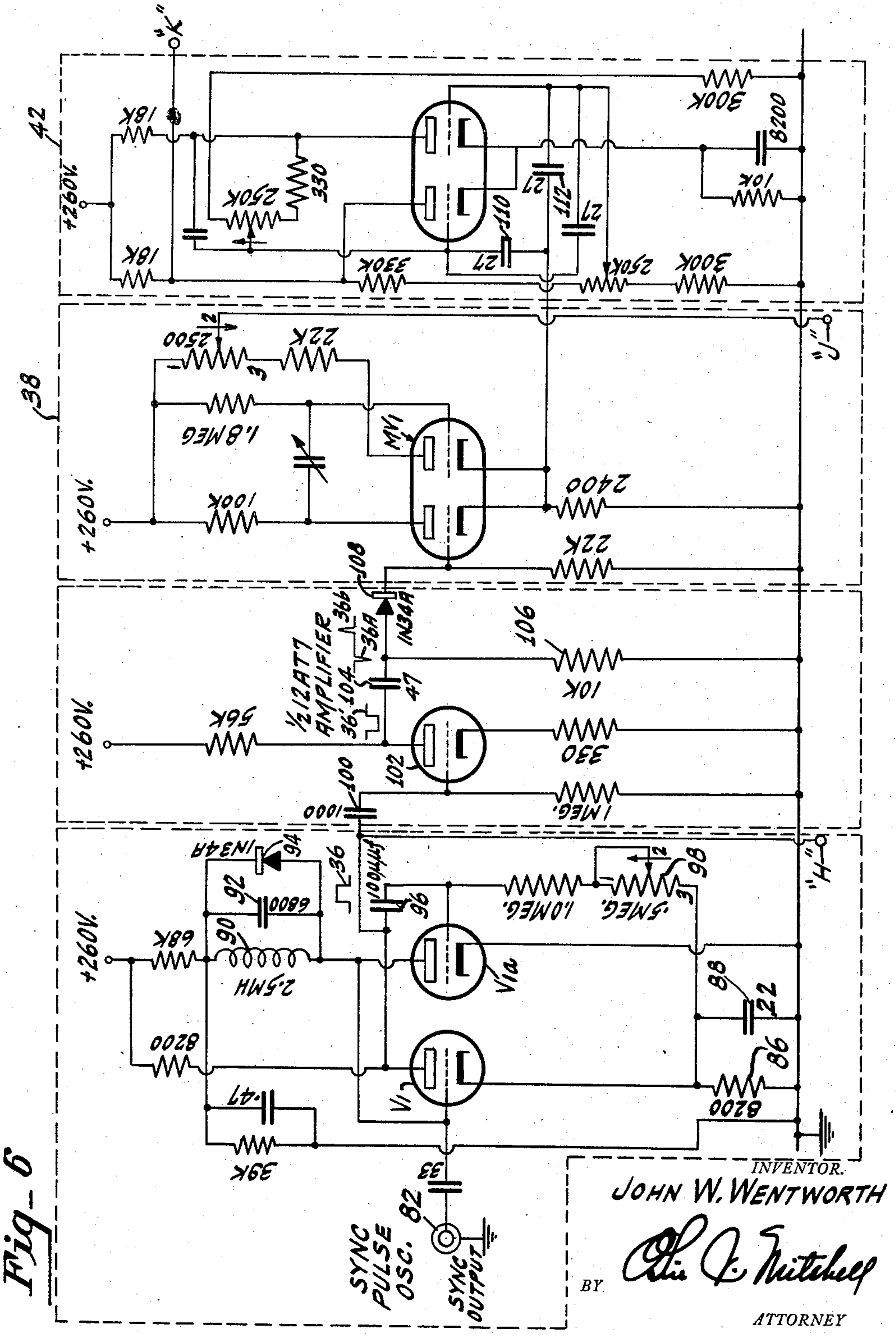
Figs. 6–10 illustrate a schematic circuit diagram of a complete operative embodiment of the apparatus shown diagrammatically in Fig. 4.

Referring to Fig. 6, the sync pulse oscillator shown within dotted line box 34 comprises an astable or free running multivibrator illustrated as being of the type described and claimed in the co-pending U. S. application of Arch C. Luther, S. N. 377,925, filed September 1, 1953. Briefly, the operation of the sync pulse oscillator 34 differs from conventional astable multivibrators in several respects, as will appear from its description. The multivibrator comprises two vacuum tubes $V_1$ and $V_{1a}$. The cathode of tube $V_{1a}$ is connected to ground, while the cathode of tube $V_1$ is connected to ground through a large resistor 86 bypassed by a storage capacitor 88. The R-C circuit in the cathode of tube $V_1$ has a large time constant relative to the period of the multivibrator so that the cathode of that tube is maintained at a relatively small potential, whereby a moderate voltage transition from the plate of tube $V_{1a}$ to the grid of tube $V_1$ is sufficient to render the latter tube conductive. Connected between the plate of tube $V_1$ and a source of positive potential (+240 volts) is a tuned circuit comprising inductance 90 and shunt capacitor 92, a crystal diode being connected in parallel with the resonant circuit which elements 92 and 90 form. The diode 94 serves to cut off or clip the positive half cycles of oscillation produced by the resonant circuit. The plate of tube $V_1$ is, as shown, coupled to the grid of tube $V_{1a}$ via a time constant circuit comprising capacitor 96 and resistor 98 whose free end is connected to the cathode of tube $V_1$. At the end of the timing cycle determined by capacitor 96 and resistor 98, tube $V_{1a}$ is rendered conductive and a surge of plate current passes from the +260 volt terminal through the resonant circuit and through tube $V_{1a}$ to ground. This surge of plate current starts an oscillation in the ringing circuit having a period determined by the values of inductance 90 and capacitor 92. The initial half cycle of such oscillation is a negative-going wave, the following positive-going half cycle of oscillation being prevented by conduction through the damping diode 94. Hence, after a negative half cycle of oscillation in the ringing circuit, the potential on the grid of tube $V_1$ and on the plate of tube $V_{1a}$ returns to +260 volts. Also during this negative half cycle, tube $V_1$ is cut off and tube $V_{1a}$ is conductive. Capacitor 88 maintains the cathode of tube $V_1$ at a constant potential, as will be understood. At the end of the half cycle of oscillation in the ringing circuit, the grid of tube $V_1$ returns to approximately 260 volts and that tube begins to conduct. In the meantime, while tube $V_1$ is cut off, timing capacitor 96 was recharged so that after tube $V_1$ becomes conductive a new timing cycle is initiated. It is thus apparent that the ringing circuit 90, 92 determines the period of time that tube $V_1$ is cut off and the timing circuit 96, 98 determines the time during which tube $V_{1a}$ is cut off. As described in the above-cited Luther application, the advantages of the oscillator in the form shown are that it produces an output pulse 36 at the plate of tube $V_1$ which has a rather steep trailing edge and which occurs at an extremely stable reptition rate. Pulse 36 is thus available at output terminal "H" and is also coupled via capacitor 100 to an amplifier 102. The negative-going pulse 36' at the output of amplifier 102 is differentiated by means of capacitor 104 and resistor 106 to produce alternate negative and positive spikes **36*a* and 36*b*, respectively. The positive spike 36*b* is passed by diode 108 and is applied as a trigger pulse to the control grid of the first tube of multivibrator 38. Multivibrator 38**, is as shown, a conventional form of cathode coupled multivibrator such as is described in volume 19 of the MIT Radiation Laboratories Series, entitled "Waveforms," chapter 5, page 170.

As determined by its time constant circuits, multivibrator 38, which is of the monostable variety, has a repetition rate of nominally 15.75 kc (or, in other words, television line rate). Taken from the plate load circuit of the second tube of multivibrator 38 is a positive-going pulse of predetermined duration which is available at terminal "J" and which, as will appear, is applied to the $(R-Y)$ gate tube 44 (Fig. 4). A negative pulse taken from the cathode of the multivibrator 38 is, in turn, coupled via capacitor 110 and 112 to the control grids of the tubes forming multivibrator 42. This last-named multivibrator is of the bi-stable type described generally in chapter 5 of the above-cited "Waveforms" (pages 164–166) and serves to divide the input pulse frequency by a factor of two, the rising, or trailing, edge of the pulse from the cathode of $MV_1$ serving as the trigger. Thus, the output of multivibrator 42, which comprises a square wave having a repetition rate of 7.875 kc., is available at terminal "K" for application to multivibrator $MV_2$ shown within dotted line box 46 of Fig. 7.

Figure 7:
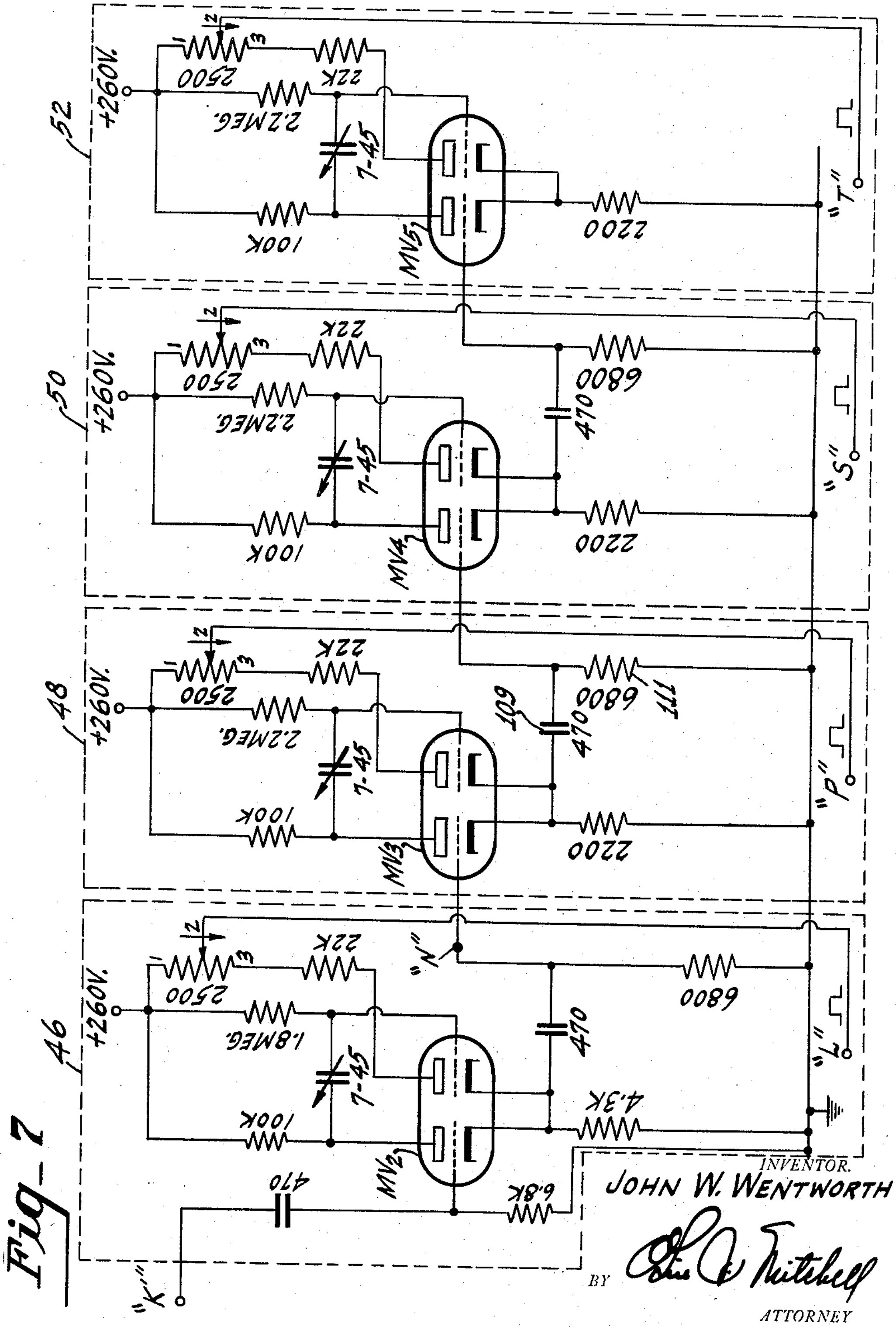

Referring to Fig. 7, terminal "K'" is intended to be coupled to terminal "K" of Fig. 6 so that there will be applied to the control grid of the left hand tube forming multivibrator $MV_2$ through an RC network that differentiates slightly a positive-going pulse corresponding to the rising edge of the 7.875 kc. square wave. This pulse is designed to trigger that multivibrator which is, incidentally, of the monostable variety. That is, for each input trigger to $MV_2$ there is made available one output pulse. Moreover, by reason of the fact that multivibrator $MV_2$ is triggered by a pulse from multivibrator 42, it will be appreciated that multivibrator $MV_2$ will produce an output pulse following, in time, the pulse produced by multivibrator $MV_1$ shown in block 38 of Fig. 6. Multivibrator $MV_2$ is substantially identical to multivibrator $MV_1$ of Fig. 6, with the exception of a different cathode resistor which is necessitated by the slightly different character of the trigger pulse applied to multivibrator $MV_2$. At terminal "L," which is connected to a point in the plate load circuit of the second tube in multivibrator $MV_2$, there is available a positive pulse. A negative pulse appearing at the cathode of $MV_2$ is differentiated by capacitor 109 and resistor 111 to produce a positive trigger pulse corresponding to the trailing edge of the pulse at terminal "N." The negative spike occurring at the leading edge of the pulse from multivibrator $MV_2$ has no effect on the following multivibrator $MV_3$. The triggering pulses are coupled from terminal "N" to the input of multivibrator $MV_3$ shown in dotted line block 48. Multivibrators $MV_3$, $MV_4$ (box 50) and multivibrator $MV_5$, (box 52) are all substantially identical to each other so that the values of the various elements in the last two multivibrators may be exactly equal to the corresponding components of multivibrator $MV_3$. The operation of multivibrator $MV_3$, $MV_4$ and $MV_5$, however, is substantially the same as that of multivibrator $MV_2$. Thus, it will be understood that each of multivibrators $MV_2$, $MV_3$, $MV_4$ and $MV_5$ will be triggered by the multivibrator preceding it so that their output pulses will occur successively in time. Thus, a positive gating pulse will be available at each of output terminals "P," "S" and "T" just as was described in connection with terminals "J" and "L" for multivibrators $MV_1$ and $MV_2$, respectively.

Figure 8:
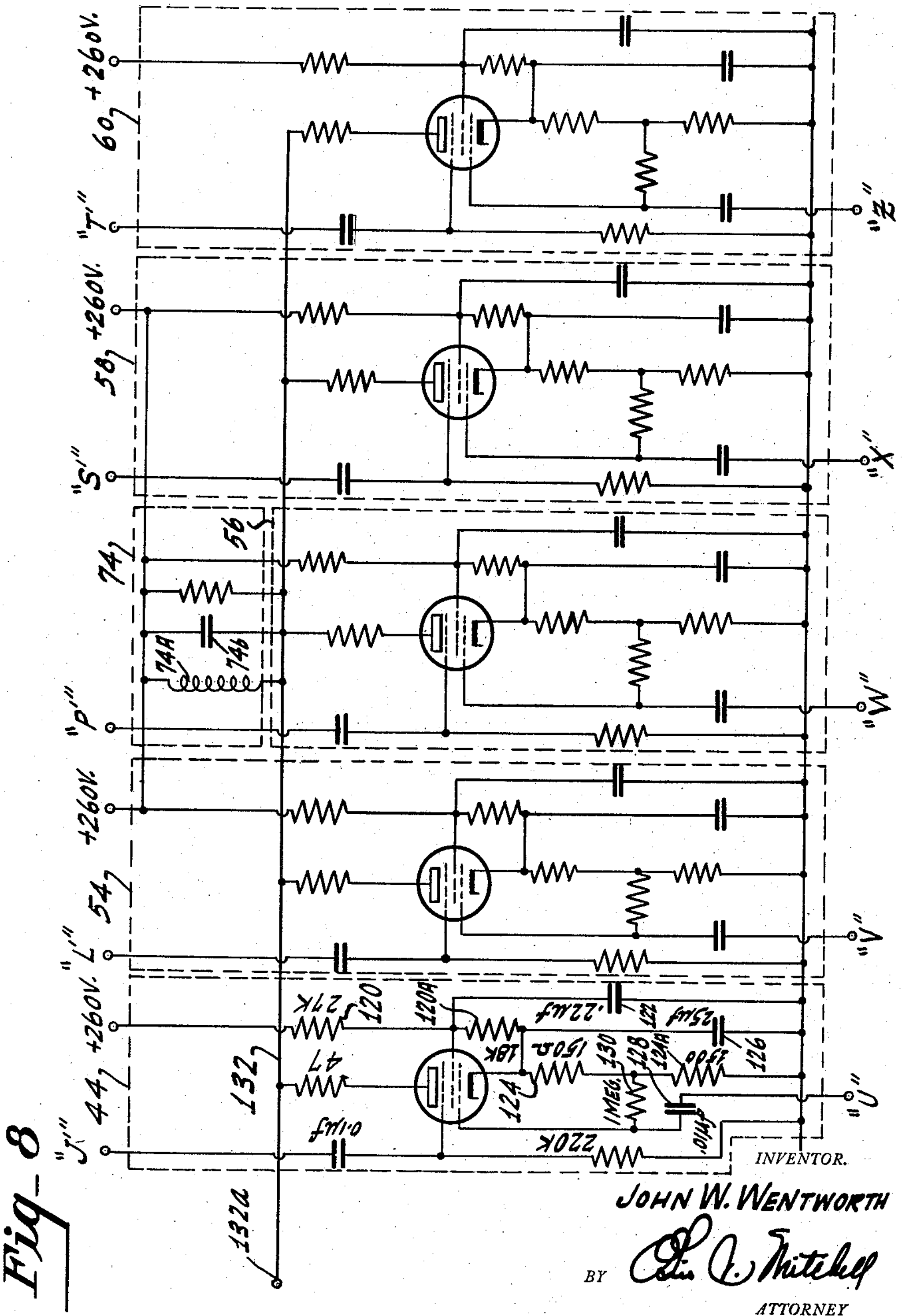

Fig. 8 includes a schematic showing of the circuits of the five gate tubes indicated diagrammatically in Fig. 4.

These gate circuits are shown in Fig. 8 within the dotted line boxes 44, 54, 56, 58 and 60. Since all of the five gate circuits are substantially identical to each other, only the $(R-Y)$ gate 44 need be described in detail. Gate 44 comprises a pentode 118 whose suppressor grid is supplied at terminal "J'" with the positive pulses from terminal "J" of multivibrator $MV_1$. The screen grid of the tube 118 is connected through dropping resistor 120 to a source of positive potential indicated as +260 volts and is bypassed to ground through a capacitor 122. The cathode of tube 118 includes a resistor 124 and shunt capacitor 126 for self-biasing purposes. Resistor 124A provides additional bias for the suppressor grid by means of current drawn through tube 118 and also through the bleeder consisting of resistors 120, 120A and 124. Coupled to the control grid of gate tube 118 via coupling capacitor 128 and grid resistor 130 is an input terminal "U" to which is applied, in a manner to be described, a subcarrier frequency wave of specific phase with respect to a reference. The anode of gate tube 118 is connected to a lead 132 which, as may be seen, is common to the anodes of the other four gating tubes shown within blocks 54, 56, 58 and 60.

In the operation of gating circuit 44, assuming a subcarrier wave of specified phase as being applied to its control grid, the tube will not conduct until there is applied, via terminals "J" and "J'," to its suppressor grid a positive gating pulse from multivibrator $MV_1$ (Fig. 6). During the occurrence of such a positive pulse on its suppressor grid, however, tube 118 will conduct so that its output will constitute a discrete burst of subcarrier wave frequency of predetermined phase. The other gating circuits shown in dotted line boxes 54, 56, 58 and 60 are not described separately. It should, however, be noted that the anode of each of those gating tubes is also connected to lead 132. Additionally, it may be seen that gate circuit 54 includes an input terminal "L'" for connection to terminal "L" at the output of multivibrator $MV_2$ and that each of the other gating circuits 56, 58 and 60 includes an input terminal bearing a reference character having a prime notation but corresponding to an output terminal of the associated multivibrator of Fig. 7. In other words, terminals "E'," "L'" and "P'" from gate circuits 56, 58 and 60 are intended for connection to output terminals "P," "S" and "T" of multivibrators $MV_3$, $MV_4$ and $MV_5$, respectively, of Fig. 7. While terminals "L'," "S'," "T'" and "P'" provide the gating pulses to their corresponding gate tubes, terminals "V," "W," "X" and "Z" constitute the input terminals to gates 54, 56, 58 and 60, respectively, to which are applied the differently phased subcarrier waves. Lead 132 terminates at the left hand side of Fig. 8 in terminal **132*a* which is, in practice, connected to a corresponding terminal 132*b*** in Fig. 10, to be described. Prior to describing the apparatus by which the successive bursts from the several gating circuits are added to each other and to the horizontal synchronizing pulses, there will be given a description of the oscillator and delay line for providing the several phases of subcarrier frequency.

Figures 9, 11:
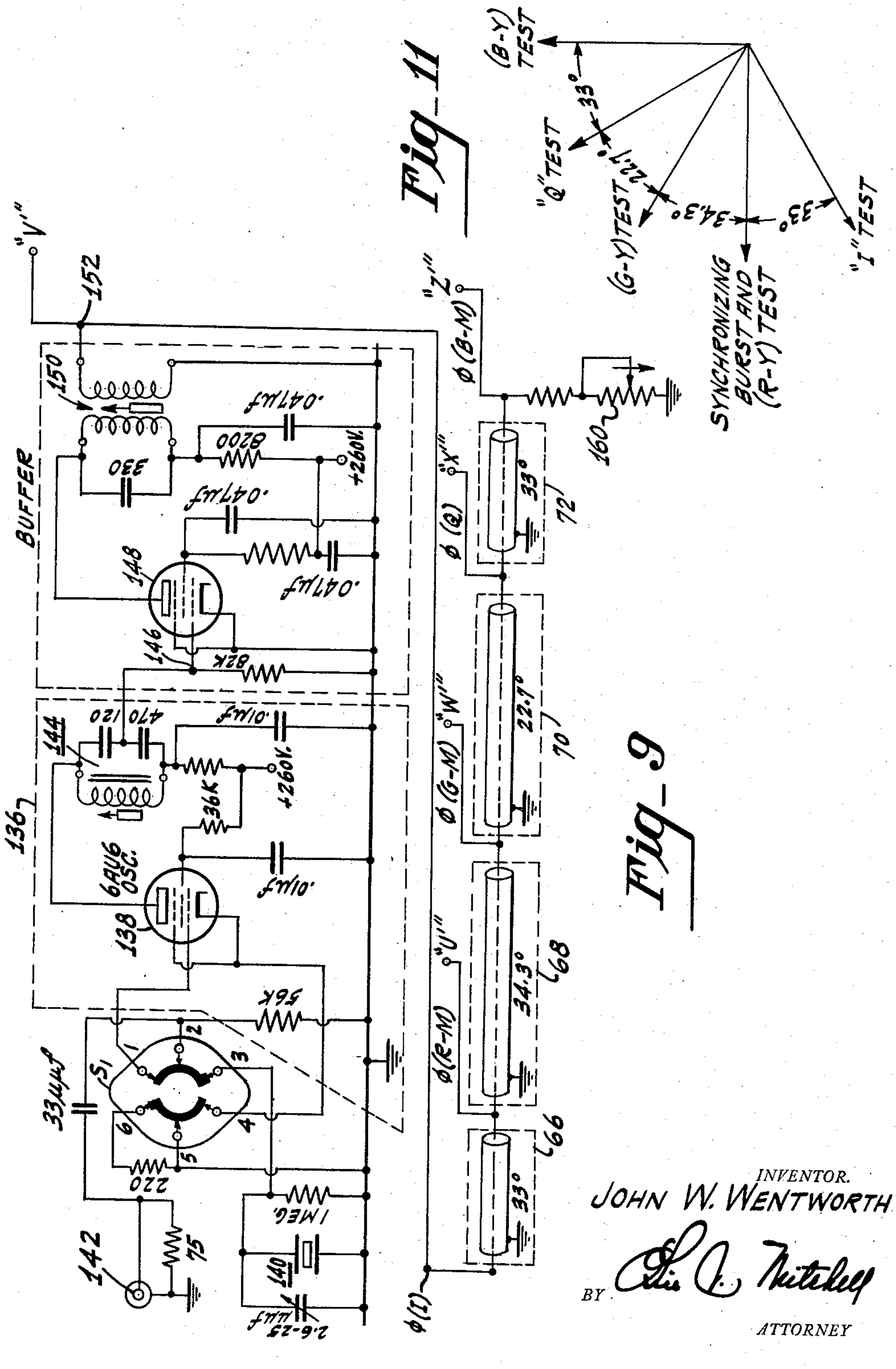
Fig. 11 is a vector diagram to be referred to infra.

Referring, therefore, to Fig. 9, there is shown within dotted line box 136 a conventional form of oscillator tube 138 whose signal input terminals are adapted to be connected via switch "$S_1$" either to the crystal tank circuit 140 or to the terminal labeled "External Subcarrier Input," namely, terminal 142. In the position of the switch "$S_1$" as shown, the crystal ringing circuit 140 is connected in circuit with tube 138 in order to form, together with the tuned circuit 144 which is in series between the plate of tube 138 and a source of positive potential, a crystal oscillator. By rotating switch "$S_1$" to its other position from that shown in the drawing, the crystal ringing circuit is effectively disabled so that tube 138 may serve as a tuned amplifier for a subcarrier wave applied to terminal 142. In either event, however, the output of tube 138 is coupled via lead 146 to the control grid of a conventional buffer amplifier 148 whose output is inductively coupled by transformer 150 to input terminal 152 of the several sections of delay line indicated within dotted line boxes 66, 68, 70 and 72. The subcarrier wave is applied, without delay, via lead 154 to terminal "V'" which is intended to be connected to terminal "V" of the "I" gate tube 54. Each of the delay line sections 66–72 may, for example, comprise an accurately cut section of a co-axial cable whose delay characteristics have been accurately calibrated per unit length. Thus, after having been delayed 33°, the subcarrier frequency wave at terminal "U'" is applied to terminal "U" at the input of the $(R-Y)$ gate circuit 44. After a further delay of 34.3°, the subcarrier frequency wave is applied via terminals "W'" and "W" to the input of the $(G-Y)$ gate circuit 56. Delay section 70 introduces an additional delay of 22.7° and its output wave is coupled via terminals "X'" and "X" to the "Q" gate circuit 58. After an additional delay of 33° which is introduced by the cable section within box 72 and which terminates in a resistor which may be nominally 73 ohms in value, the subcarrier frequency wave is coupled via terminals "Z'" and "Z" to the $(B-Y)$ gate 60. While the value of the characteristic terminating resistance 160 has been said to be nominally 73 ohms, it should be understood that its value may be reduced, for example, if necessary, to compensate for capacity effects in the line.

As thus far described, the apparatus of Figs. 6, 7, 8 and 9 have furnished gating pulses to the five gate circuits together with five different phases of the subcarrier frequency wave from oscillator 136. As has been stated, the output or load circuits of all of the gates are joined to a common lead 132 which ends with terminal 132*a*. Connected between lead 132 which is common to the five gate circuits' loads and to a source of positive operating potential indicated as +260 volts is a filter circuit 74 in the form of a peaking arrangement which includes inductance 74*a* and capacitance 74*b*. The peaking circuit serves as a bandpass filter whose lower and upper cutoff points may be, for example, two and five megacycles, respectively. In other words, the bandpass filter 74 is centered on the subcarrier wave frequency of approximately 3.58 megacycles. This filter is included for the purpose of eliminating unwanted disturbances resulting from the gating action in the five gating tubes.

Figure 10:
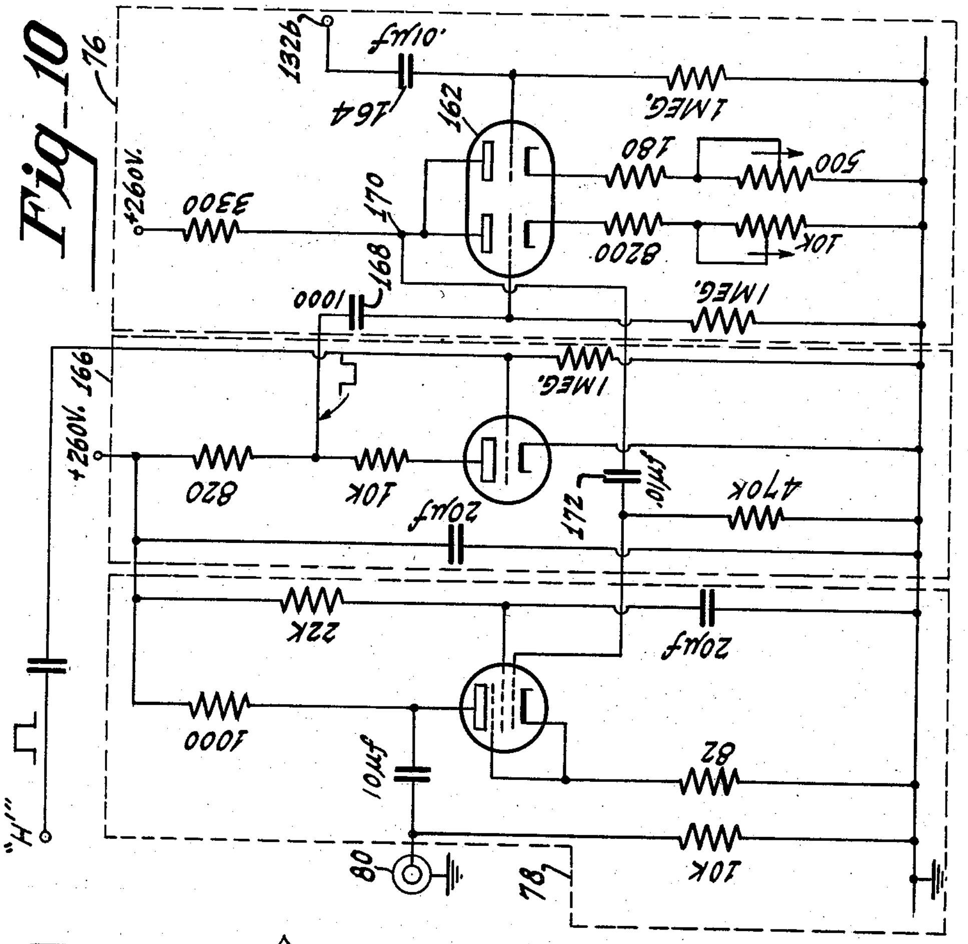

Terminal 132*a* is actually connected to the input terminal 132*b* of Fig. 10 wherein is shown a mixer or adder stage 76 comprising a dual triode 162 whose two sections are connected in the manner illustrated. Coupled via capacitor 164 to the control grid of the right hand section of adder tube 162 are the successive bursts from the five gate tubes. Also shown in Fig. 10 is a sync pulse amplifier 166 which is of conventional design and which has applied to its control grid, via terminals "H" (Fig. 6) and "H", the positive-going sync pulses from the output of oscillator 34. The amplified sync pulses are coupled via capacitor 168 to the control grid of the left hand section of adder tube 162. Thus, the composite output of tube 162 when viewed at terminal 170 will be substantially identical to the waveform of Fig. 5, with the exception that its polarity will be the reverse thereof. The output of adder tube 162, including sync pulses and bursts, is applied via capacitor 172 to the input of output amplifier 78 which is also conventional as to circuitry and which need not be described in detail. The final output of the apparatus is available at terminal 80 in Fig. 10 and is a replica of the waveform of Fig. 5.

Fig. 11 is a vector diagram illustrating the relationships of the five subcarrier frequency bursts. By comparing Fig. 11 with the vector diagram of Fig. 1 it may be noted that each test burst is exactly 90° out of phase with the phase position of the corresponding signal component, and that the same burst that provides a test for $R-Y$ is in the correct phase to serve as a color synchronizing burst. Since the demodulation process performed by demodulators 20 and 21 of the receiver of Fig. 2 is that of multiplication, the result of the 90° rotation will be that of providing zero output at each circuit in the receiver for the burst which is designated by the term which each such circuit normally provides in normal operation. That is to say, therefore, in normal operation of the receiver, the "I" demodulator 21 is fed a continuous wave from the oscillator 15, which wave is in exact phase with the "I" signal transmitted by the broadcast station. Hence, in such normal broadcast operation, the "I" demodulator 20 will provide maximum output when "I" signal is present. Similarly (in broadcast operation) the "Q" demodulator is provided with a continuous subcarrier frequency wave whose phase is identical to that of the transmitted "Q" signal, so that its output is maximum when "Q" signal is present.

Figure 12:
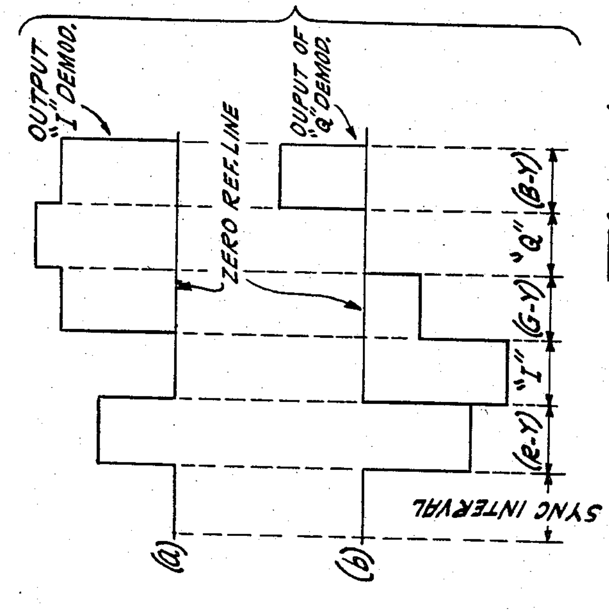
Fig. 12 is a diagram of the waveforms of a correctly aligned color receiver.

By applying the test signal of Fig. 5 (the angular relationships of which are shown by the vector diagram of Fig. 11) to the video amplifier of the receiver of Fig. 2 with the 90° phase shift of the so-called "I," "Q" and "color difference" signal bursts, the alignment of the receiver may be determined by connecting the vertical deflecting plates of a cathode ray oscilloscope to each of the following points, and observing the resultant waveforms, which are illustrated by Fig. 12(*a*) and Fig. 12(*b*):

(1) At the output of low pass filter 23 in the "Q" channel as shown in Fig. 12(*b*) the signal level corresponding to the burst in the test waveform designated "Q" will be of zero amplitude while the signal level corresponding to each of the other bursts will have some amplitude. If the horizontal sweep of the cathode ray oscilloscope is synchronized at any odd multiple of the line frequency, the waveforms corresponding to lines No. 1 and No. 2 are superimposed, and the no-burst interval of line No. 2 provides a convenient zero reference line in the pattern.

(2) At the output of the low pass filter 24 in the "I" channel (as in Fig. 12(*a*)) the signal level corresponding to the "I" burst in the test waveform will have zero amplitude while each of the other four will have some amplitude.

In addition to testing the phase alignment of the "I" and "Q" demodulators, the test signal produced by the apparatus of Figs. 6–10 is equally effective in testing the adjustment of the matrixing circuits of a color receiver. This latter utility may also be understood from a comparison of the vector diagrams of Figs. 1 and 11 which illustrate the fact that the test bursts designated $(R-Y)$, $(G-Y)$ and $(B-Y)$ are displaced 90° from the normal angular positions at which those signals are located in broadcast. Because of the phase shift employed, the matrixing circuit will produce a zero output, respectively, for each of the color difference designated bursts at the terminals at which signals of corresponding color normally appear. In order to test the alignment of the matrix of a color television receiver, therefore, it is necessary only to connect the vertical deflecting plates of an oscilloscope across each of the following terminals and observe the burst envelopes:

(1) At the "red" signal electrode of the color kinescope, the signal level corresponding to the burst designated $(R-Y)$ in Fig. 5 will be zero while the other burst intervals are of various amplitudes;

(2) At the "green" signal electrode of the kinescope, the interval of only the $(G-Y)$ burst will be zero; and (3) At the "blue" signal electrode of the kinescope, only the $(B-Y)$ burst interval will have zero amplitude.

At this point, it should be noted that the reason for eliminating the last four bursts from alternate television lines in the test signal is to provide an unmodulated sweep of the oscilloscope used in the test. That is, the scanning electron beam is permitted, during alternate line intervals, to sweep across the phosphor screen along a "zero"

amplitude line whereby to produce a convenient reference line on the oscilloscope screen for use in observing the signal amplitudes during the various burst intervals on succeeding lines. This zero reference line does not extend through the first burst interval, because that burst is present on every line.

In view of the foregoing explanation, it should be apparent to those skilled in the art that the test signal waveform generated by the apparatus of the present invention affords a ready indication of the phase alignment of the "I" and "Q" demodulators of a color television receiver. Assuming that the "I" and "Q" test signals are not zero at the output terminals of the "I" and "Q" demodulators, respectively, the phasing of the demodulators can be varied until the zero outputs are observed. Additionally, by checking the phasing of the demodulators at the outset, the later observations at the color signal electrodes of the kinescope are direct indications of the condition of the matrixing circuits, which is extremely helpful in the servicing or original alignment of receivers.

Still another use to which the test signal described supra may be put is that of checking the gains of the various color or chrominance channels with respect to the gain of the luminance channel. This test may be conducted simultaneously with the test of the matrixing circuits, since it involves the observation, on an oscilloscope, of burst envelope levels at the several color signal electrodes of the receiver under consideration. More specifically, the gain of each of the color channels relative to luminance gain may be determined by examining the test waveform at each of the following points in the color kinescope:

(1) On the "blue" signal electrode, the first burst level $(R-Y)$ should be substantially equal in amplitude to the sync pulse level when the gain of the "blue" channel in the receiver is correctly set. While the reason for this fact may be shown by use of the equations of Fig. 1, a simpler explanation is that, because of the 90° difference between the bursts of Fig. 11 and the standard vector positions of Fig. 1, the $(R-Y)$ burst actually constitutes a blue color difference signal, insofar as the receiver is concerned. According to the Equation 8 of Fig. 2, the gain of $(B-Y)$ channel should properly be 2.03 relative to the gain of the Y channel in order for the receiver to derive the blue color difference signal from the "I" and "Q" proportions shown. If the peak-to-peak amplitude of the test bursts is made equal to the amplitude of the sync pulse (which may be considered unity), then the peak amplitude is 0.5. In a correctly adjusted $(B-Y)$ channel, this peak signal is multiplied by 2.03, yielding an output level that is substantially, although not exactly, equal to unity, which means that the $(R-Y)$ burst envelope will be apparently equal to sync pulse amplitude (and of the same polarity) when the blue channel gain is correct.

(2) On the "green" signal electrode of the kinescope, the level of the signal during the last or $(B-Y)$ burst should be equal to 29 percent of the sync pulse amplitude and of the same polarity. The reason for this relationship stems, first of all, from the fact that the $(B-Y)$ test burst is actually an $(R-Y)$ signal, in view of the 90° rotation of the vectors. By measuring the projection of the $(B-Y)$ test burst of Fig. 11 into the $(G-Y)$ phase direction as shown in Fig. 1, it may be seen that the projection (i. e., the length of $(G-Y)$ from its origin to a perpendicular drawn from the extremity of the $(B-Y)$ test burst vector to the $(G-Y)$ vector) is proportional to the cosine of the angle between $(R-Y)$ and $(G-Y)$, or 34.3° which is equal to 0.825. Since the proper gain of the $(G-Y)$ channel is 0.703 from Equation 9 in Fig. 1, the projection of a test burst of 0.5 peak amplitude is proportional to $0.5\times.825\times.703$ or 0.29. Consequently, the correct amplitude during the $(B-Y)$ test burst interval in the $(G-Y)$ channel is equal to 0.29, or 29 percent of sync amplitude, which is unity.

(3) On the "red" signal electrode of the kinescope, the envelope of the "I" burst should be equal to substantially 31 percent of the sync pulse amplitude and of the same polarity, assuming the gain of the red channel is properly set. It is necessary, in illustrating the derivation of the value 31 percent, to measure the projection of the "I" test burst vector of Fig. 11 into the $(R-Y)$ phase direction, as shown in Fig. 1. These two vectors define an angle of 57° whose cosine is 0.545. Since the gain of the $(R-Y)$ channel must be 1.14 (Equation 7), the signal level produced in the red channel by an "I" test burst of 0.5 peak amplitude is equal to $0.5\times0.545\times1.14$ or 0.31 relative to the sync pulses.

In each of the above cases of checking color gain, the gain control of the circuit in question may be varied, if necessary, to produce the desired demodulated burst level with respect to the level of the sync pulse which level is, as explained, a true indication of correct color gain.

While it has not been specifically pointed out hereinabove, the horizontal sweep circuits of the cathode ray oscilloscope employed in making the observations enumerated supra may be conveniently synchronized with the test signal generator of the present invention by connecting the sweep circuits to the sync output terminal 82 (Figs. 4 and 6) thereby to use the sync pulses 36 for such purpose.

From the foregoing, it will be recognized that the apparatus of the present invention provides a test signal waveform each of whose component signals serves the ends of determining the phase and gain alignments and settings in a color television receiver of the type described. Although the invention has been described in accordance with a specific embodiment wherein the various elements, including delay lines, have been selected to produce a signal matched in a particular manner to the proposed NTSC standards, it should be borne in mind that the different burst phases may be changed, as may the oscillator frequency, to fit different standards. Moreover, the fact that specific forms of multivibrators, gate circuits and the like have been disclosed by way of illustration of an operative embodiment should not be construed as by way of limitation, since changes may be made therein without departing from the scope of the invention as defined by the appended claims.

Having thus described my invention, what I claim as new and desire to secure by Letters Patent is:

1. A test signal generator for color television receiver apparatus of the type adapted to derive component color signals from received color information in the form of a color carrier wave whose separate phases are modulated in accordance with color difference signals, which comprises: a source of sinusoidal oscillation of frequency substantially equal to the frequency of such color carrier wave; means for deriving separate phases of such oscillations, each bearing a predetermined relation to such separate phases of such color carrier wave; a source of television line rate synchronizing pulses; and means responsive to such synchronizing pulses for producing sequentially, within a television line interval, a burst of each of such separate phases of sinusoidal oscillation and means for adding such synchronizing pulses to such bursts, each of said produced bursts being displaced in phase by 90° from a corresponding one of said separate phases of said color carrier wave.

2. The invention as defined in claim 1 wherein said last-named means includes means for eliminating all except the first one of such bursts during predetermined line intervals.

3. A test signal generator for color television receiver apparatus of the type adapted to derive component color signals from received color television information in the form of a plurality of phases of a color carrier wave, each phase being modulated in accordance with selected chrominance-representative signals, which comprises: oscillator means for producing a sinusoidal wave equal in frequency to the frequency of such color carrier wave, means for deriving a plurality of separate phases of such sinusoidal wave, each phase bearing a fixed angular relationship to one of such plurality of color carrier wave phases; and gating means coupled to said last-named means for producing sequentially, within a television line interval, a burst of each of such separate phases of sinusoidal oscillation.

4. The invention as defined by claim 3 wherein said gating means comprises normally open electronic switch for each of such separate phases of sinusoidal oscillation and means for successively closing said switches.

5. The invention as defined by claim 3 wherein said gating means comprises an electronic switch for each of such separate phases of sinusoidal oscillation, a source of television line synchronizing pulses, and means responsive to such pulses for closing said switches successively.

6. The invention as defined by claim 5 wherein said last-named means comprises a multivibrator coupled to each of said switches and to each other and means for applying such synchronizing pulses to one of said multivibrators.

7. A test signal generator for color television receiver apparatus of the type adapted to derive component color signals from received color television information in the form of a first phase of a color carrier wave modulated by a first set of chrominance signals and a second phase of such carrier wave displaced from said first phase by a fixed angle modulated by a second set of chrominance signals, which comprises: an oscillator for producing a wave of sinusoidal energy of frequency substantially equal to the frequency of such color carrier wave; a source of television line rate synchronizing pulses; means coupled to said oscillator for shifting the phase of such sinusoidal wave; and means responsive to synchronizing pulses from said source for sequentially producing, within a television line interval, a first burst of sinusoidal energy of said frequency and of substantially the same phase as one of said color carrier wave phases and a second burst of sinusoidal energy of said frequency, the phase of said second burst being angularly displaced from the phase of said first burst by an amount equal to the angular displacement between such first and second color carrier wave phases.

8. A test signal generator for color television receiver apparatus of the type having means for deriving component color signals from received color television information in the form of two phases of a color carrier wave of fixed frequency separated in phase by a fixed angle, each phase being the vectorial resultant of a plurality of color difference signals, each of which is represented by a vector having a predetermined phase with respect to a reference which comprises: an oscillator for producing a wave of sinusoidal energy of such fixed frequency; a source of television line rate synchronizing pulses; means coupled to said oscillator for shifting the phase of such sinusoidal wave; and means coupled to said last-named means and responsive to such synchronizing pulses for producing sequentially, within a television line interval, a first burst of sinusoidal energy of said fixed frequency and of substantially the same phase as one of such carrier wave phases, a second burst of such energy whose phase is displaced from the phase of such first burst by an angle substantially equal to such fixed angle, and a plurality of additional bursts each of which has a phase corresponding to that of one of such color difference signal vectors.

9. The invention as defined by claim 8 wherein said phase-shifting means comprises a length of delay line and wherein said last-named means comprises a plurality of gates connected to spaced points on said delay line and means for rendering said gates conductive in succession.

References Cited in the file of this patent

UNITED STATES PATENTS

| | | |
|---|---|---|
| 2,666,181 | Courtillot | Jan. 12, 1954 |
| 2,733,433 | Morrison | Jan. 31, 1956 |
| 2,734,939 | Houghton | Feb. 14, 1956 |
| 2,736,761 | Sziklai | Feb. 28, 1956 |

OTHER REFERENCES

Principles of NTSC Compatible Color Television, pp. 88–97, Electronics, February 1952.